United States Patent [19]
Chen

[11] Patent Number: 5,282,639
[45] Date of Patent: Feb. 1, 1994

[54] FOLDING TANDEM BICYCLE

[76] Inventor: Shou-Mao Chen, No. 7-3, Lane 2, Ta An Kang Rd., Ta Chia Chen, Taichung Hsien, Taiwan

[21] Appl. No.: 966,438

[22] Filed: Oct. 26, 1992

[51] Int. Cl.⁵ .......................... B62K 3/12; B62K 3/14; B62K 15/00
[52] U.S. Cl. .................................. 280/231; 280/259; 280/287
[58] Field of Search ............... 280/278, 287, 231, 259, 280/260, 261

[56] References Cited

U.S. PATENT DOCUMENTS

| | | | |
|---|---|---|---|
| 3,608,917 | 9/1971 | Cogliano | 280/278 |
| 3,680,879 | 8/1972 | Cogliano | 280/278 |
| 4,995,626 | 2/1991 | Montague | 280/278 |
| 5,135,246 | 8/1992 | Montague | 280/278 |
| 5,184,838 | 2/1993 | Becoat | 280/259 |

*Primary Examiner*—Mitchell J. Hill
*Attorney, Agent, or Firm*—Morton J. Rosenberg; David I. Klein

[57] ABSTRACT

A folding tandem bicycle includes a front body part, a rear body part, an intermediate body part connected between the front body part and the rear body part by parallel pairs of upright tubes and pairs of connecting devices, a front transmission mechanism driven by a set of pedals through a front sprocket to rotate a front flywheel and a front wheel through a cable, and a rear transmission mechanism driven by a set of pedals through a rear sprocket to rotate a rear flywheel and a rear wheel through a chain. By disconnecting either one of each pair of connecting devices, the front body part, the intermediate body part and the rear body part are allowed to be folded up and attached with one another side by side. By disconnecting the intermediate body part from the front and rear body parts, the front and rear body parts are connected into a single-seat bicycle for one rider.

4 Claims, 4 Drawing Sheets

5,282,639

FOLDING TANDEM BICYCLE

BACKGROUND OF THE INVENTION

The present invention directs itself to a bicycle and relates more particularly to a folding tandem bicycle that may be conveniently folded to reduce its storage space or alternatively adjusted into a single-seat bicycle for a single rider.

A tandem bicycle, as illustrated in FIG. 1, includes two seats with respective sets of pedals placed tandemly for two riders. Due to the fact that a tandem bicycle has two seats and respective sets of pedals which are placed in tandem, the length of the tandem bicycle is relatively long. Since this type of structure for a tandem bicycle is not collapsible, such occupies a large storage volume and is inconvenient for transportation.

SUMMARY OF THE INVENTION

The present invention concept has been developed to relieve the aforementioned disadvantages. It is therefore an object of the present invention to provide a folding tandem bicycle which may be alternatively arranged into a single-seat bicycle for one rider. It is another object of the present invention to provide a folding tandem bicycle which may be conveniently folded to reduce its storage space. According to the preferred embodiment of the present invention, the tandem bicycle is generally comprised of a frontal body portion, a rear body portion, and an intermediate body portion connected between the frontal body portion and the rear body portion by parallel pairs of upright tubes and pairs of connecting devices. A front transmission mechanism driven by a set of pedals through a front sprocket to rotate a front flywheel and associated front wheel through a cable is provided. A rear transmission mechanism is driven by a set of pedals through a rear sprocket to rotate a rear flywheel and a rear wheel through a chain. Disconnection of either one of each pair of connecting devices causes the front body portion, the intermediate body portion and the rear body portion to be folded in attached coupling with one another in side by side relation whereas disconnecting the intermediate body portion from the front and rear body portions causes the front and rear body portions to be formed into a single-seat bicycle for a single rider.

DETAILED DESCRIPTION OF THE PREFERRED EMBODIMENT

Figure 2:
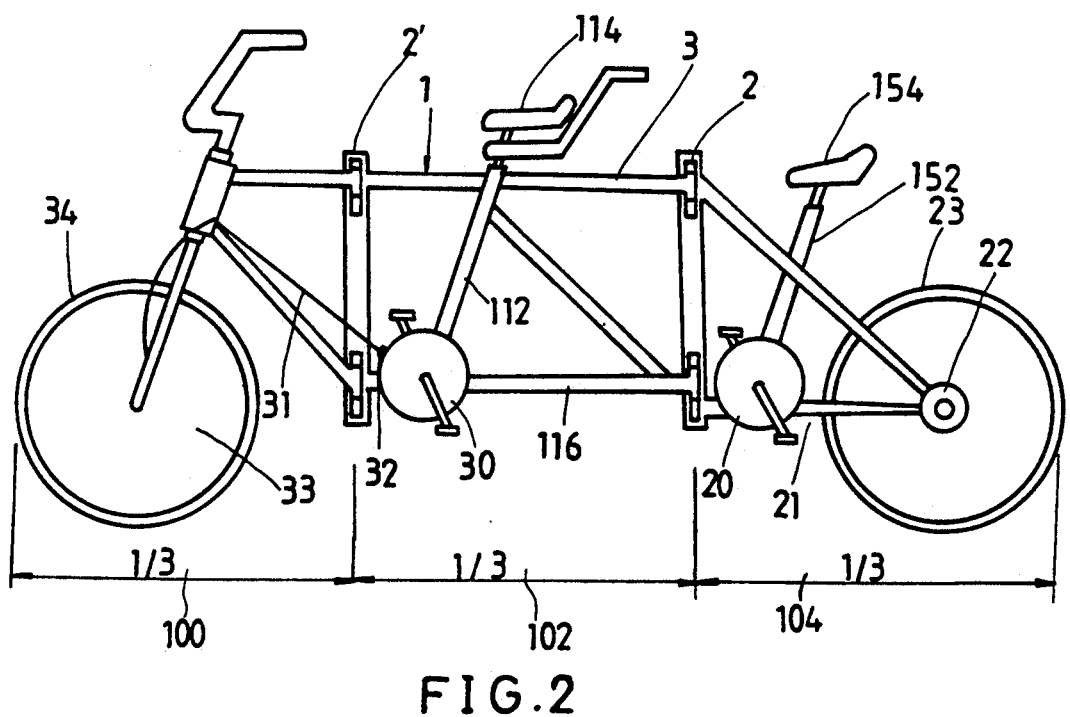
FIG. 2 is an elevational view of the preferred embodiment of the tandem bicycle of the present invention arranged into the form of a tandem coupling for two riders.

Referring now to FIG. 2, there is shown a front wheel 34 and a rear wheel 23 of bicycle 1 which are individually driven by two transmission mechanisms, namely, a front transmission mechanism which includes a front sprocket 30 driven by a set of pedals to rotate the front wheel 34 through a cable 31 connected to front flywheel 33 as well as a rear transmission mechanism which includes a rear sprocket 20 driven by a set of pedals to rotate the rear wheel 23 through a chain 21 connected to a rear flywheel 22.

Figure 3A:
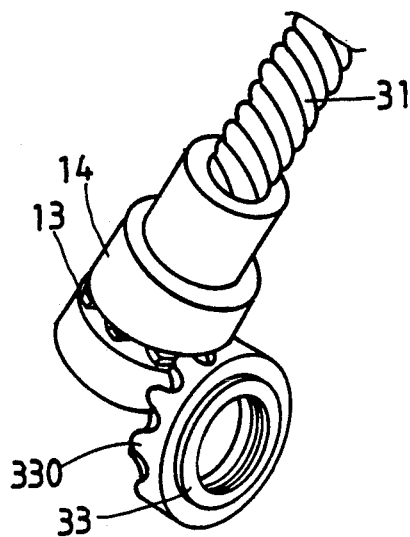
FIG. 3A is a perspective view partially cut away of a portion of the front transmission mechanism for driving the front wheel of the tandem bicycle of FIG. 2.
Figure 3B:
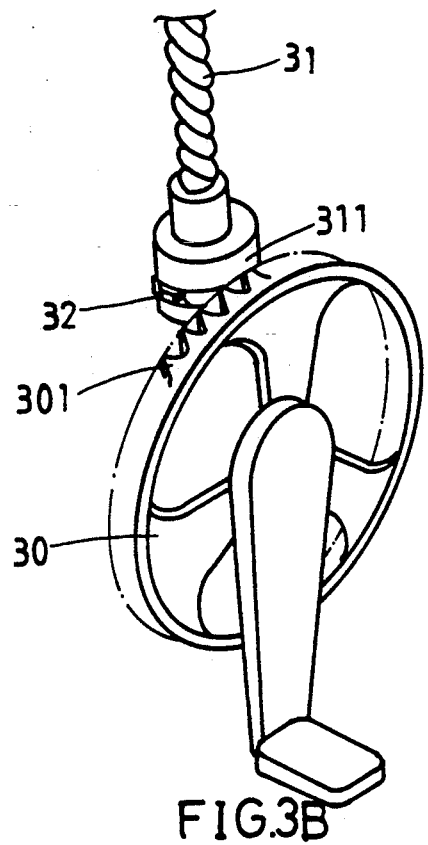
FIG. 3B is a perspective view, partially cut away of a portion of the front transmission mechanism coupled to pedals of the tandem bicycle of FIG. 2.

Referring to FIG. 3B, the front sprocket 30 includes a series of teeth 301 formed within and around the peripheral edge thereof on one side as shown. The front flywheel 33 as shown in FIG. 3B has a series of teeth 330 formed within and around the peripheral edge thereof on one side. The cable 31 has one end coupled to cylindrical end member 311 which has a toothed groove 32 extending around the peripheral wall thereof for mating engagement with the teeth 301 on the front sprocket 30. An opposite end of cable 31 is coupled to cylindrical end member 14 which has a toothed groove 13 extending around the peripheral wall thereof for mating engagement with the teeth 330 on the front flywheel 33. Thus, rotation of the front sprocket 30 causes the cable 31 to correspondingly rotate the front flywheel 33.

Figure 4:
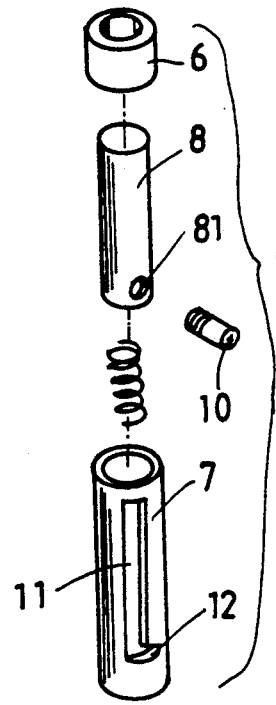
FIG. 4 is an exploded view of a connecting device according to the present invention.

Referring now to FIGS. 4 and 2, the bicycle 1 includes three sections or portions namely, frontal body portion 100, intermediate body portion 102 and rear body portion 104 connected in a line by two parallel pairs of upright tubes 2 and 2' defining respectively a second and first pair of upright tubes having respective locking devices. A connecting mechanism includes locking ring 6 fastened internal upright tube 2 at either end through a welding process. A sleeve 7 is fastened inside the upright tube 2 and spaced below the locating ring 6 defining a longitudinal slot 11 and a locating notch 12 extending sideways from the longitudinal slot 11 at a bottom section as shown. A spring 9 is positioned inside the sleeve 7 with a lock bolt 8 inserted in the sleeve 7 supported on the spring 9 for locking the intermediate upper portion tube 3 to either ones of the second upright tube pair. A knob 10 is inserted through the longitudinal slot 11 formed through the sleeve 7 and inserted into a hole 81 formed through the lock bolt 8 for displacement of the lock bolt 8. The lock bolt 8 is supported by the spring 9 in the locking position to lock the intermediate upper tube 3 in position. The lock bolt 8 is moved from the locking position to the unlocking position by moving the knob 10 downwardly along the longitudinal slot 11 and positioning it into the locating notch 12.

Figure 5:
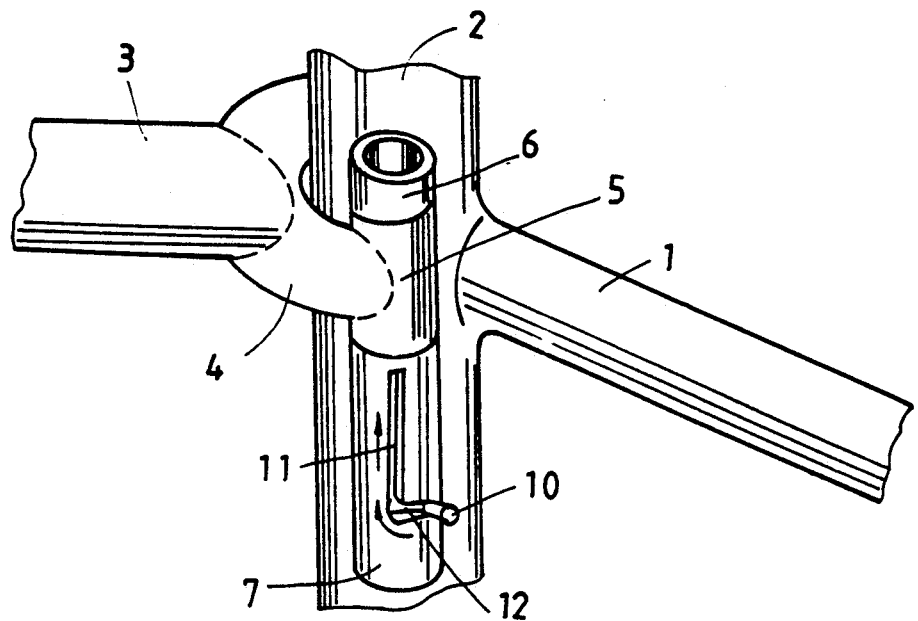
FIG. 5 is an installed view showing the connecting device fastened inside an upright tube to an upper tube.
Figure 6:
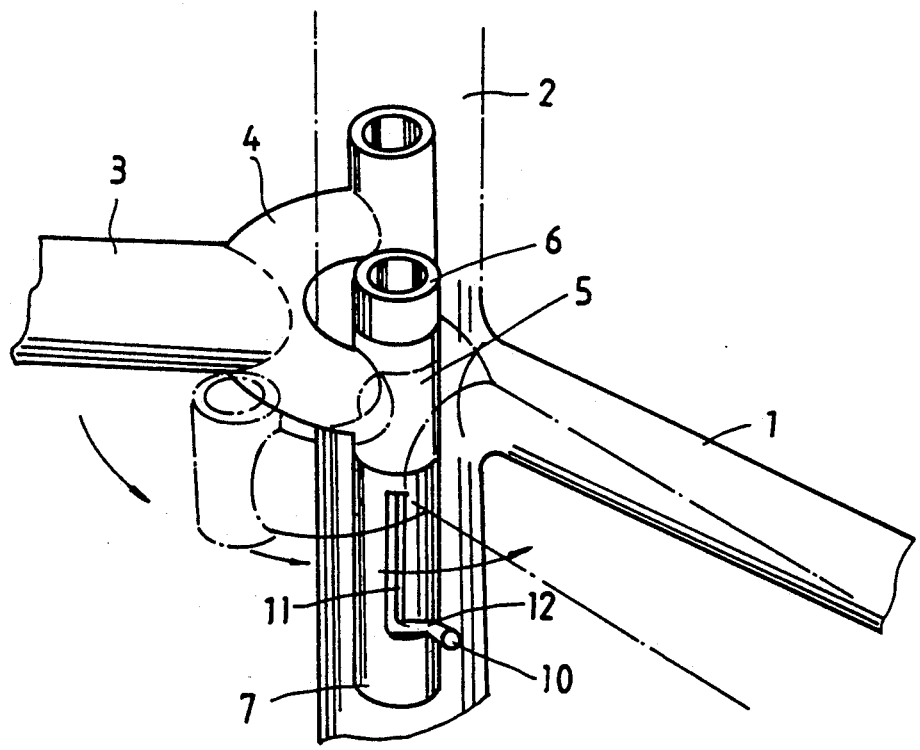
FIG. 6 is a perspective view, partially cut away showing one socket on either terminal of a forked end of an upper tube disconnected from a respective upright tube for permitting the upper tube to be rotated on the respective upright tube through an angle of 180°.
Figure 7:
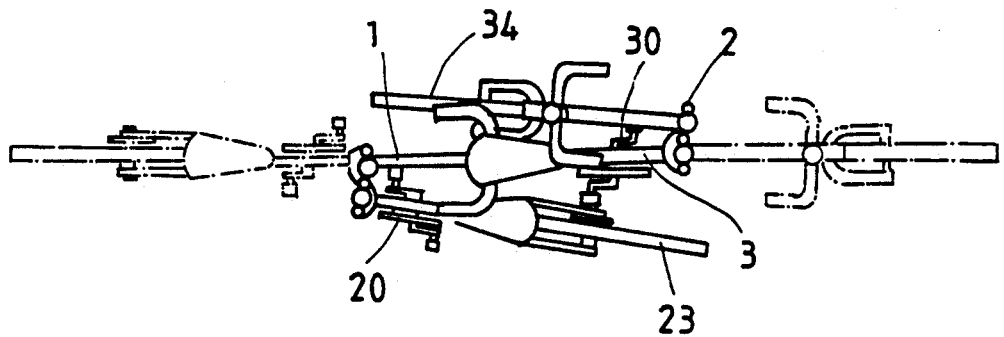
FIG. 7 is a plan view of the three parts of the tandem bicycle shown in FIG. 2 folded and attached in side by side relation; and, FIG. 8 is an elevational view of the present invention arranged into a single-seat bicycle for one rider.

Referring to FIGS. 5 and 6, the intermediate upper tube 3 has two sockets 5 coupled to the end sections of either forked end 4 thereof and respectively inserted into holes (not shown) formed on either pair of upright tubes 2 or 2' between a respective locating ring 6 and the respective sleeve 7 and locked in place by the respective lock bolt 8 as shown in FIG. 5. The lock bolt 8 of the locking device at either end on either one of the upright tubes 2 is released from the socket 5 on either terminal of the respective forked end 4 of the upper intermediate portion tube 3 by moving the respective knob 10 downwardly and locking it in the respective locking notch 12 to permit the intermediate upper portion tube 3 to be rotated through 180° on the other tube of the set of upright tubes 2 of the same pair. In similar manner, lower intermediate portion tube 116 is coupled to first and second pairs of upright tubes 2 and 2' with an identical connection mechanism as previously described. Thus, the three parts of the bicycle may be folded into one third of its full length. As illustrated in FIG. 7, the bicycle may be folded with the three portions attached in side by side relation.

Figure 1:
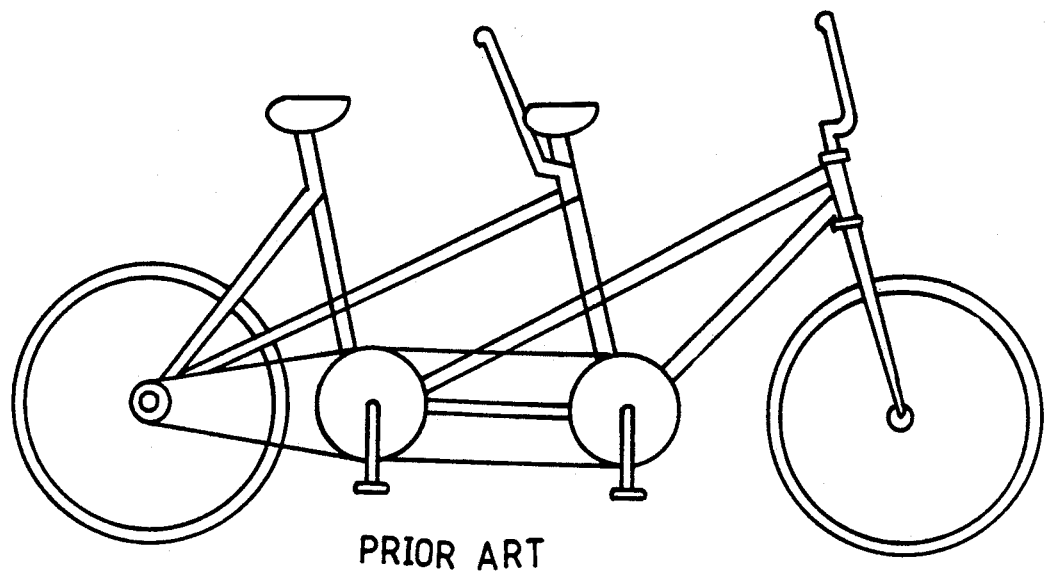
FIG. 1 is an elevational view of a tandem bicycle according to the prior art.

As shown in FIGS. 2 and 1, frontal seat tube 12 is provided on bicycle 1 for connection to and support of frontal saddle 114. Additionally, rear seat tube 152 is similarly mounted to bicycle 1 for support of rear saddle 154 as is well known in the art.

Figure 8:
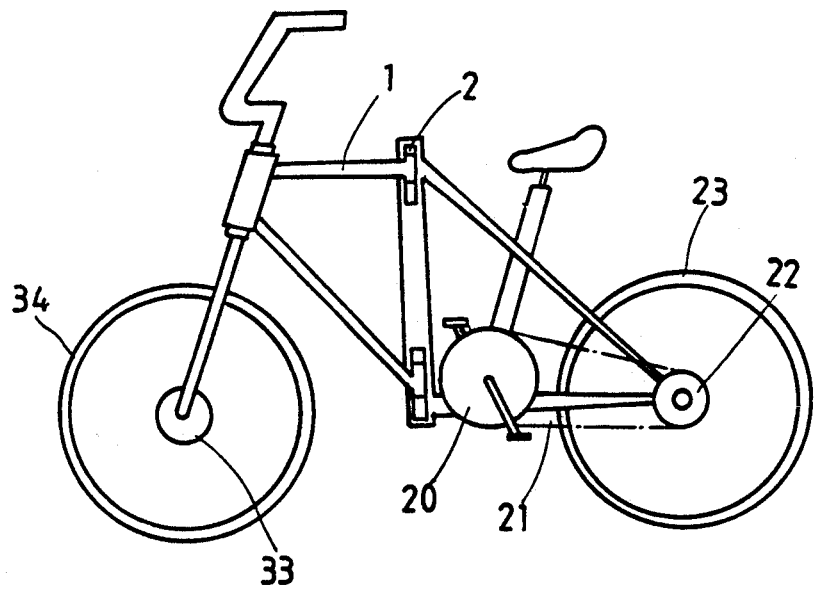

Referring to FIG. 8, the intermediate body portion of bicycle 1 may be disconnected from the frontal and rear portion for permitting the front and rear portion to be connected into a single-seat bicycle for a single rider. In this arrangement, only the rear transmission mechanism is used for driving the single-seat bicycle.

As indicated, the present invention is to provide a tandem bicycle with two separate transmission mechanisms which can be conveniently folded to reduce storage space when bicycle 1 is not in use or alternatively arranged into a single-seat bicycle for one rider.

What is claimed is:

1. A tandem bicycle comprising:
   a frontal body portion having a front flywheel coupled to a handlebar by a head tube for positionally stabilizing a front wheel, a frontal portion upper tube and a frontal portion lower tube respectively coupled to said head tube, said frontal portion upper tube and said frontal portion lower tube of said frontal body portion each having a pair of frontal sockets coupled to a respective forked end section of said frontal portion upper and lower tubes;
   an intermediate body portion having a first pair of upright tubes extending in a vertical direction parallel each to the other, an intermediate upper tube having a front end connected to said first pair of upright tubes and a rear end terminating in an upper tube forked end section coupled to a pair of intermediate sockets, a seat tube to support a saddle, and an intermediate portion lower tube extending parallel to said intermediate upper tube having a front end connected to said first pair of upright tubes and a rear end terminating in a lower tube forked end section having a pair of rear intermediate sockets;
   a rear body portion having a second pair of upright tubes extending in said vertical direction parallel each to the other and connected to said intermediate upper and lower tubes, a rear seat tube to support a rear saddle, a rear flywheel fastened to positionally stabilize a rear wheel;
   connection means for connecting the pair of frontal sockets to said first pair of upright tubes and the rear intermediate sockets to said second pair of upright tubes, said connection means including a pair of connecting devices wherein each connecting device includes a locating ring fixedly fastened internal one upright tube at either end, a sleeve fastened internal a respective upright tube spaced below said locating ring, said sleeve having a longitudinal slot formed therethrough and a locating notch extending from said longitudinal slot at a bottom section of said slot, a spring positioned internal said sleeve and a lock bolt inserted in said sleeve supported on said spring for locking a socket between said locating ring and said sleeve, and a knob member inserted through said longitudinal slot and connected to said lock bolt, said lock bolt being supported by said spring in a locking position to lock the respective socket in position or movable from said locking position to an unlocking position for permitting the respective socket to be disconnected from the respective upright tube by displacing said knob member along said longitudinal slot and inserting said knob into said locating notch;
   frontal transmission means for rotationally displacing said front wheel, said frontal transmission means including a front sprocket driven by a first set of pedals to rotate said front flywheel and said front wheel through a cable, said front sprocket having a series of sprocket teeth formed within a peripheral edge thereof, said front flywheel having a series of flywheel teeth formed around and within a peripheral edge thereof, said cable having two opposite ends respectively coupled with a cylindrical end member, each of said cylindrical end members having a toothed groove formed within a respective peripheral wall for mating engagement with the sprocket teeth or said front flywheel for permitting said front flywheel and said front wheel to be rotated as said front sprocket is rotated by said first set of pedals; and,
   rear transmission means for rotationally displacing said rear wheel, said rear transmission means including a rear sprocket driven by a second set of pedals to rotate said rear flywheel and said rear wheel by a chain coupling.

2. The folding tandem bicycle according to claim 1 where said pair of frontal sockets on said frontal body portion on one side thereof are disconnected from one tube of said first pair of upright tubes and said rear intermediate sockets on said intermediate body portion on an opposite side thereof are disconnected from one tube of said second pair of upright tubes for permitting said frontal body portion, said intermediate body portion, and said rear body portion to be rotationally folded in side by side relation.

3. The folding tandem bicycle as recited in claim 1 wherein said intermediate body portion is disconnected from said frontal body portion and said rear body portion for permitting said frontal body portion and said rear body portion to be coupled into a single-seat bicycle adapted for use by a single rider.

4. The folding tandem bicycle as recited in claim 1 wherein said front transmission means and said rear transmission means are independently operational for rotating said front wheel and said rear wheel respectively.

* * * * *